DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 10

T917,011

SEQUESTERING RESIN FROM CYANOETHYLATED POLY(ETHYLENE IMINE)

Edward A. Grannen, Upland, and Leon Robinson, Diamond Bar, Calif., assignors to Occidental Petroleum Corp., Los Angeles, Calif.

Continuation of application Ser. No. 193,703, Oct. 29, 1971. This application May 24, 1973, Ser. No. 363,380

Int. Cl. C08g *33/08*

U.S. Cl. 260—2.2 C

No Drawing. 12 Pages Specification

This application describes a substantially water-insoluble, cross-linked sequestering resin having a plurality of units in arbitrary sequence selected from the group consisting of

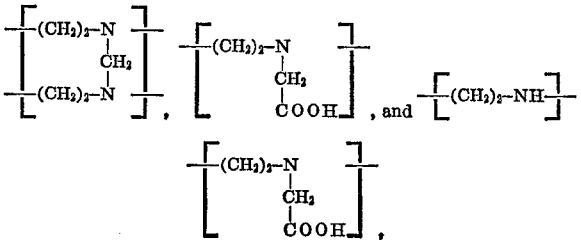

and about 15% of the units are

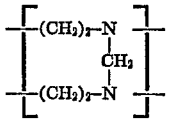

Ethyleneimine is formed into a low molecular weight branched pre-polymer in an acidic aqueous solution. This is then cyanoethylated and cross-linked in a strongly acid solution of formaldehyde and hydrocyanic acid. The resulting cross-linked polymer is hydrolyzed to provide active sequestering groups $>N—CH_2—COOH$ on the chain.